United States Patent [19]

Sakata

[11] Patent Number: 5,428,385
[45] Date of Patent: Jun. 27, 1995

[54] CIRCUIT FOR DETECTING COLORS IN IMAGE SIGNALS

[75] Inventor: Haruo Sakata, Hino, Japan

[73] Assignee: Clarion Co., Ltd., Tokyo, Japan

[21] Appl. No.: 233,453

[22] Filed: Apr. 26, 1994

[30] Foreign Application Priority Data

May 14, 1993 [JP] Japan .................................. 5-136646

[51] Int. Cl.⁶ .............................................. H04N 9/68
[52] U.S. Cl. ..................... 348/30; 348/143;
348/180; 348/649; 348/82; 382/191
[58] Field of Search ...................... 348/180, 25, 29, 30,
348/32, 82, 135, 161, 143, 152, 645, 649;
382/17; H04N 9/68

[56] References Cited

U.S. PATENT DOCUMENTS 4,737,842 4/1988 Nagasaki ................................ 348/30
4,953,011 8/1990 Mori et al. ............................. 348/30

FOREIGN PATENT DOCUMENTS

0062769 4/1983 Japan ..................................... 382/17

*Primary Examiner*—Victor R. Kostak
*Attorney, Agent, or Firm*—Koda and Androlia

[57] ABSTRACT

A circuit for detecting a specified color in a color image signal operates on first, second and third primary color signals from a color camera. A complementary color, resulting from additive mixing of two primary colors, is detected by taking the sum and differences of the signal representing the two primary colors. The third primary signal is subtracted from the sum signal to produce a vector sum signal and the difference signal is rectified. The signal which indicates the presence of a complementary color is generated by subtracting the rectified signal from the vector sum signal and comparing it to a fixed reference level. A primary color is detected by subtracting the sum signal from the third primary signal to produce the vector sum signal. Fine adjustment of the target color is obtained by amplifying the two primary color signals differentially to maintain a constant sum of the two primary color signals.

36 Claims, 7 Drawing Sheets

$$ES = \frac{1}{3}(ER + EG + EB)$$

CIRCUIT FOR DETECTING COLORS IN IMAGE SIGNALS

BACKGROUND OF THE INVENTION

The present invention relates to a mechanism for detecting regions of a specified color in a color television signal and specifically to systems for detecting a specified color for warning operators of equipment to the presence, in the field of view of a television camera, of objects or personnel exhibiting a specified color.

An essential part of the operation of industrial equipment, such as construction machinery is the implementation of safety procedures and mechanisms to prevent accidents. Safety precautions are particularly important when operating large machines with massive or rapidly moving parts. This is especially true when such machines are used on busy streets in the presence of workers and passers-by.

A typical safety procedure followed by operators of mobile construction machinery, such as cranes and trucks, is to rely on spotters and visual checks. The spotters and the operator check a hazard zone, a zone within reach of moving elements of the machinery, to determine if it is clear of unauthorized personnel.

Sole reliance on visual checking entails a risk of overlooking people in the hazard zone. An automated means for detecting and warning of people in the hazard zone can help to prevent the danger posed by such oversight. Such a warning system could be implemented to supplement or replace visual checking.

One known device for providing such automated warning systems is disclosed in laid-open Japanese patent application No. 5-63500. A color television camera, which produces a National Television System Commission (NTSC) signal, is trained on the hazard zone. A circuit monitors the signal from the color television camera to detect the presence of the specified color in the NTSC signal when an object of the specified color enters the hazard zone.

Figure 11:
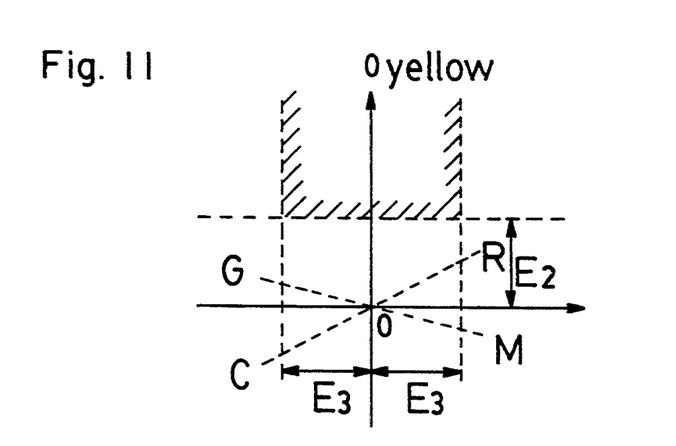
FIG. 11 is a vector diagram showing the definition of yellow in an image signal according to the prior art.

Referring to FIG. 11, in the NTSC signal format, hue is represented by a phase-modulated color signal whose instantaneous value can be transformed, by a known relationship, into a color vector on a Maxwell color chart. The color vector originates at the position 0 and points in a direction which indicates the hue. For example, when the color vector points to 10 o'clock, the color represented is green. When it points to 2 o'clock, the color represented in red. Between these colors are their additive mixtures grading between green and red. For example, an equal additive mixture of green and red produces yellow. The result of additive mixtures can be found by vector addition of the color vectors of the component hues. Thus, a unit vector representing red, vectorially added to a unit vector representing green, results in a unit vector representing yellow.

The magnitude of the color vector indicates the degree of saturation. Thus, a vector of zero magnitude represents zero saturation, or white. The luminance or intensity of the image is carried by a separate signal embedded in the NTSC format known as the luminance signal.

In a color television, the NTSC signal is transformed by circuitry into three primary color signals, one each for the colors red, green and blue. This is done for the purpose of producing an image on a color cathode ray tube. The relative proportion of the signals representing each of the primary colors represents both the magnitude and direction of the color vector. For example, if all three signals are equal in magnitude, the color represented is white, since vectorial addition produces a null vector. If the blue signal is zero and the green and red signals are equal, yellow results. If the blue signal then becomes non-zero, the saturation of the yellow falls until, finally the blue signal reaches the value of the equal red and green signals, whereupon white is represented.

The circuit of the known device first automatically controls the gain of the color signal levels to maintain a constant amplitude of their sum. The signals are analyzed to determine if the color vector falls in the zone indicated by shading in FIG. 11. The shaded zone is defined by the following parameters:

1) the range in which the magnitude of the yellow component of the color vector is at or greater than a specific value, E2.
2) the range in which the magnitude of the component perpendicular to the yellow component is less than another specified value, E3.

In addition, the following definitional limit is applied:

3) the luminance signal is at or greater than a specified value. A color signal following all three limits is defined as yellow in the foregoing prior art device.

The portion of the chrominance element of the NTSC signal that distinguishes yellow is limited to a band of 0.5 MHz. Therefore, the above circuit, which extracts specified color elements cannot detect yellow in the color-difference signal when the desired object area on the screen is too small. This is because the time during which the chrominance signal represents yellow is too short to be represented by frequencies below 0.5 MHz.

OBJECT AND SUMMARY OF THE PRESENT INVENTION

The object of the present invention is to provide a circuit for detecting color elements in image signals that overcomes the drawbacks of the prior art.

Another object of the present invention is to provide a circuit for detecting colors in image signals that is capable of detecting specific colors from a small area on a screen.

Briefly, there is described a simple circuit for detecting a specified color in a color image signal. The circuit operates on the primary color signals from a color camera. To detect a complementary color resulting from additive mixing of two primary colors, sum and differences of the signal representing the two primary colors are generated. The third primary signal is subtracted from the sum signal to produce a vector sum signal and the difference signal is rectified. The signal which indicates the presence of a complementary color is generated by subtracting the rectified signal from the vector sum signal and comparing it to a fixed reference level. A primary color is detected by subtracting the sum signal from the third primary signal to produce the vector sum signal. Fine adjustment of the target color is obtained by amplifying the two primary color signals differentially to maintain a constant sum of the two primary color signals.

According to an embodiment of the present invention, there is disclosed, a circuit for detecting a color in a color image signal, comprising: the color image signal including first, second and third color elements, means for adding the first and second color elements to generate a sum signal, means for subtracting the first and second color elements to generate a first difference signal, means for subtracting one of the third color signal and the first sum signal from the other of the third color signal and the first sum signal to generate a second difference signal, means for rectifying the first difference signal to generate a rectified signal and means for subtracting the rectified signal from the second difference signal to generate a third difference signal.

According to another embodiment of the present invention, there is disclosed, a method for detecting a color in a color image signal including first, second and third color elements, comprising: adding the first and second color elements to generate a sum signal, subtracting the first and second color elements to generate a first difference signal, subtracting one of the third color signal and the first sum signal from the other of the third color signal and the first sum signal to generate a second difference signal, rectifying the first difference signal to generate a rectified signal and subtracting the rectified signal from the second difference signal to generate a third difference signal.

According to still another embodiment of the present invention, there is disclosed, a circuit for detecting a color in an image signal having first, second and third color elements, comprising: means for amplifying the first color element by a first gain to generate a first amplified color element, the first second and third color elements having first, second and third amplitudes respectively, the first amplified color element having a fourth amplitude, means for amplifying the second color element by a second gain to generate a second amplified color element, the second amplified color element having a fifth amplitude, means for adjusting at least one of the first and second gains, means for controlling one of the first, second and third amplitudes and the third, fourth and fifth amplitudes to maintain a constant sum of the third, fourth and fifth amplitudes, means for adding the first amplified color element and the second amplified color element to generate a first sum signal, means for subtracting the one of the first amplified color element and the second amplified color element from the other of the first amplified color element and the second amplified color element to generate a first difference signal, means for subtracting the first sum signal from the third color element to generate a second difference signal, means for rectifying the first difference signal to generate a rectified signal and means for subtracting the second difference signal from the rectified signal to generate a third difference signal.

The above and other objects, features and advantages of the present invention will become apparent from the following description read in conjunction with the accompanying drawings in which like reference numerals designate the same elements.

DETAILED DESCRIPTION OF THE PREFERRED EMBODIMENTS

One application of color detection devices is a hazard-reduction system for construction sites. A camera is set up to view a hazard zone at a construction site. The NTSC signal of the camera is monitored by a circuit for the appearance of a specific color in its field of view. The circuit triggers an event when that color appears in its field of view, such as when workers wearing the color enter the field of view. Typically, the specific color the circuit is set to monitor is yellow. The color yellow may appear on uniforms or helmets of workers.

Figure 2:
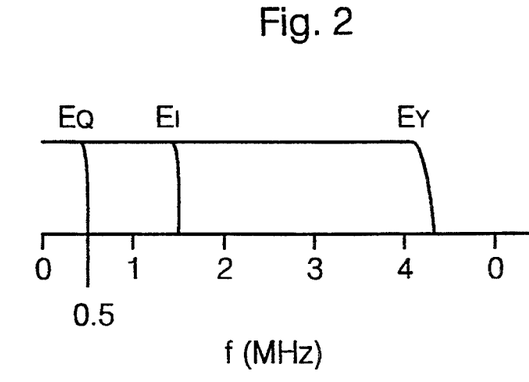
FIG. 2 is a diagram of the transmission band of an NTSC signal.

Referring to FIG. 2, the NTSC format for color image signals employs a luminance signal, $E_Y$, and two chrominance signals $E_I$ and $E_Q$. The luminance signal $E_Y$ indicates the brightness of the image, irrespective of color. Chrominance signals $E_I$ and $E_Q$ represent color as coordinates on respective complementary color axes on a chromaticity diagram. $E_I$ represents the color's coordinate on a orange-cyan axis and $E_Q$, the color's position on a green-magenta axis. To represent the color yellow, a common warning color, the coordinate of the image color on the orange-cyan axis, and therefore the $E_Q$ signal, would be non-zero.

The luminance signal $E_Y$ occupies 4.1 MHz of the transmission band and can therefore define fine details of an image. Thus, a region of contrasting luminance that is small relative to the field of view imaged by the color camera can be represented by the NTSC signal format. Details of color contrast cannot be represented in detail because the bandwidths of the $E_I$ and $E_Q$ signals are much lower than that of the luminance signal $E_Y$. Furthermore, the $E_Q$ signal, which is necessary for distinguishing yellow, is confined to 0.5 MHz. Thus, a yellow object in the field of view of a camera will not register as yellow in the NTSC signal if it occupies a small percentage of the image field being transmitted.

Because of the frequency limitations of the chrominance portion (the $E_I$ and $E_Q$ signals) of the NTSC signal format, monitoring a wide field of view is difficult. For example, if a wide angle lens is used to increase the field of view of the camera, the proportionate area of helmets and uniforms is decreased. Small areas translate to rapid changes in the color image signal, which, because of the frequency limitations of the NTSC format, cannot be transmitted. The result is a reduction in the saturation of the specific color in the transmitted NTSC signal due to temporal averaging of the $E_Q$ portion of the chrominance signal. In addition, note that although the $E_I$ element of the chrominance signal encompasses a greater frequency range (1.5 MHz) than the $E_Q$ element which distinguishes yellow, detection of colors other than yellow may produce false-positive results when indicated at the higher frequencies. Thus, the 0.5 MHz handicap applies to all colors which might be monitored by a system.

Figure 3A:
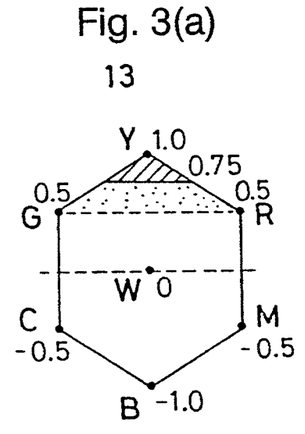
FIGS. 3A and 3B are a vector diagrams indicating the representation of the color yellow according to the embodiment of FIG. 1.

Referring to FIG. 3(a), the labeled points represent three primary colors red R, green G and blue B. Between each pair of points is another point representing a color that results when the colors of each pair are additively mixed. Thus, Mixing of red and green gives yellow Y. Similarly, magenta M results from the mixing of blue B and red R and cyan C from the mixing of green G and blue B. As the center of the hexagonal region is approached, the saturation of the colors decreases; that is the colors become closer to white. White is represented at the center of the diagram.

A vector originating from the center of the diagram may be used to represent a color. Then the amplitude of the color vector from the center of the hexagon to any point on its perimeter represents a color exhibiting maximum saturation. The maximum magnitude of each color is defined in the diagram to be unity (one). The direction of the color vector then represents its color. The direction may be specified by an angle with respect to some arbitrary line.

The color resulting from additive mixing of component colors can be found by vectorial addition of the color vectors representing the components. Any color can be represented by vectorial addition of positive fractions of red R, green G and blue B unit color vectors $E_R$, $E_G$ and $E_B$, respectively. When $E_R$, $E_G$ and $E_B$ are all equal to one, white is represented. Pure saturated red is represented by $E_R=1$, $E_G=0$ and $E_B=0$. A saturated yellow is represented by $E_R=1$, $E_G=1$ and $E_B=0$. The latter is obtained by the vectorial addition. If $E_{Yellow}$ is defined as the unit vector in the yellow direction, then vector arithmetic gives:

$$E_{Yellow} = (\tfrac{1}{2})(E_R + E_G) - E_B \quad (1)$$

To define a zone on the diagram that embraces all reasonably saturated yellows, we could take all colors where $E_{Yellow}$ is greater than or equal to some value. If that value is 0.5, then reds and greens will be included. If the value of is set at 0.75, yellows with fairly high saturation are needlessly excluded.

To improve separation and detectability of the color yellow, a new definition of yellow can be employed. If $E_{Yellow}$ is expressed as:

$$E_{Yellow} = (\tfrac{1}{2}) \cdot (E_{R0} + E_{G0}) - E_{B0} - (\tfrac{1}{2}) \cdot |E_{R0} - E_{G0}| \quad (2)$$

where $E_{R0}$, $E_{G0}$ and $E_{B0}$ are amplified version of the $E_R$, $E_G$ and $E_B$ signals. As before, W (white) is still represented by $E_R=1$, $E_G=1$ and $E_B=1$.

Figure 3B:
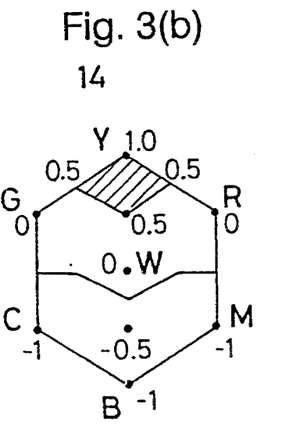

Referring now to FIG. 3(b) Equation (2) is represented by the shaded area of a color vector diagram. For $E_{Yellow} \geq 0.5$, the shaded area indicates that R and G are adequately distinguished from yellow. Furthermore, even at low saturation levels, good discrimination of yellow is still possible.

Embodiment 1

Figure 1:
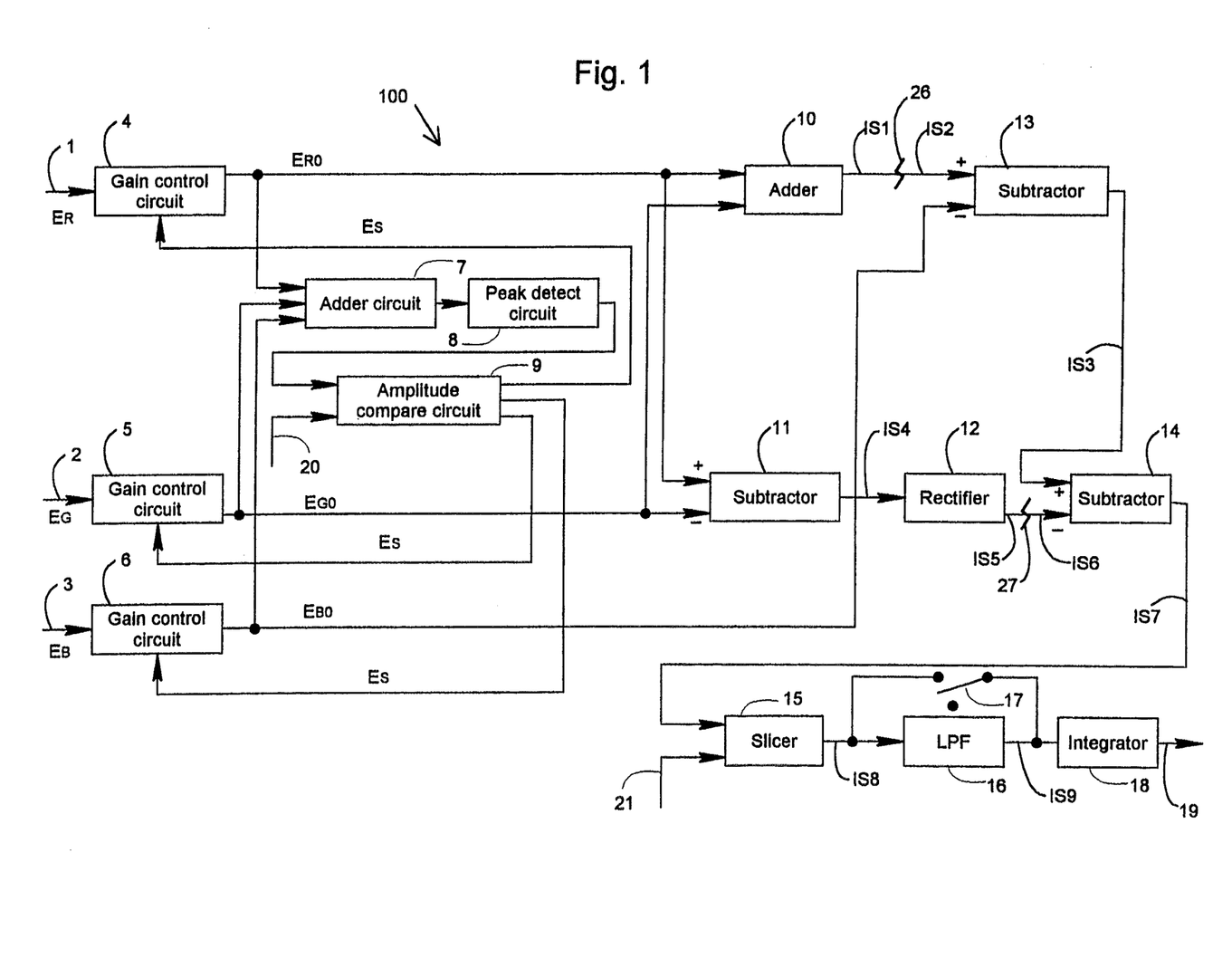
FIG. 1 is a block diagram of a circuit for detecting colors in image signals according to an embodiment of the present invention.

Referring to FIG. 1, a color detecting circuit, shown generally at 100, processes color input signals $E_R$, $E_G$ and $E_B$, corresponding to the primary colors red, green and blue. Color input signals $E_R$, $E_G$ and $E_B$ may be derived from an NTSC signal or directly from color camera outputs corresponding to red, green and blue.

The processing by color detecting circuit 100 is performed in accord with the definition represented by Equation (2). Color detecting circuit 100 has inputs 1, 2 and 3 to which color signals $E_R$, $E_G$ and $E_B$, are applied. Color signals $E_R$, $E_G$ and $E_B$ are applied to inputs of gain control circuits 4, 5 and 6 to produce outputs $E_{R0}$, $E_{G0}$ and $E_{B0}$, respectively. Outputs $E_{R0}$, $E_{G0}$ and $E_{B0}$ of gain control circuits 4, 5 and 6 are summed by an adder circuit 7, which is a matrix adder, to generate a composite signal $E_C$. Composite signal $E_C$ may be expressed by Equation (3).

$$E_C = (\tfrac{1}{3})(E_{R0} + E_{G0} + E_{B0}) \quad (3)$$

Composite signal $E_C$ is applied to a peak detector circuit 8. An output of peak detector 8 indicates the amplitude of composite signal $E_C$. The output of peak detector 8 is applied to a first input of amplitude comparator circuit 9 which compares the output to a reference signal 20 applied to a second input of amplitude comparator circuit 9. Amplitude comparator circuit 9 generates an error signal $E_S$ based on the comparison. Error signal $E_S$ is applied to a respective gain control inputs of gain control circuits 4, 5 and 6, controlling the gains of gain control circuits 4, 5, 6 to maintain a constant peak amplitude of $E_C$. Thus, outputs $E_{R0}$, $E_{G0}$ and $E_{B0}$ of gain control circuits 4, 5 and 6 have a combined amplitude which remains constant. The above configuration maintains the amplitudes of outputs $E_{R0}$, $E_{G0}$ and $E_{B0}$ constant relative to each other.

Output $E_{R0}$ of gain control circuit 4 and output $E_{G0}$ of gain control circuit 5 are added by adder 10 to generate a first interim signal IS1. First interim signal IS1 is applied to an input of an attenuator 26 which reduces the amplitude of first interim signal IS1 by 50 percent to generate a second interim signal IS2. Thus, second interim signal IS2 is equal to $(\tfrac{1}{2}) \cdot (E_{R0} + E_{G0})$. Subtractor 13 subtracts output $E_{B0}$ of gain control circuit 6 from second interim signal IS2, output by attenuator 26, to generate third interim signal IS3. Thus third interim signal IS3 is equal to $(\tfrac{1}{2}) \cdot (E_{R0} + E_{G0}) - E_{B0}$, which is the operation represented by Equation (1). Third interim output IS3 is applied to a positive input of subtractor 14.

Output $E_{R0}$ is applied to a positive input of a subtractor 11. Output $E_{G0}$ is applied to a negative input of subtractor 11. Subtractor 11 subtracts output $E_{G0}$ from $E_{R0}$ to generate a fourth interim signal IS4. Fourth interim signal IS4 is applied to a rectifier 12 to generate a fifth interim signal IS5. Fifth interim signal IS5 is the absolute value of fourth interim signal IS4. Fifth interim signal IS5 is applied to an attenuator 27 which reduces an amplitude of fifth interim signal IS5 by 50 percent to generate sixth interim signal IS6. Sixth interim signal IS6 is applied to a negative input of subtractor 14 which subtracts sixth interim signal IS6 from third interim signal IS3 to generate seventh interim signal IS7. Seventh interim signal IS7 is therefore a result represented by Equation (2).

Seventh interim signal IS7 is applied to a slicer 15 to generate an eighth interim signal IS8 which is equal to the portion of seventh interim signal IS7 lying above a reference signal 21. Thus, when reference signal 21 is 0.5 volts, eighth interim signal IS8 is represented by the shaded area in FIG. 3(b).

Slicer 15 could be replaced by a circuit providing a binary output such as, for example, a comparator, which outputs a 0 or 1 indicating whether the color yellow is detected. For analogue slicer 15, eighth interim signal IS8 is applied to a low pass filter 16. Low pass filter 16 filters out high frequency elements of eighth interim signal IS8 at or above a specified frequency. The specified frequency establishes a minimum detectable area of yellow, preventing the hypersensitive detection that occurs when the area of the detected yellow color is too small. A bypass switch 17 provides a means for bypassing low pass filter 16.

An output of bypass switch 17, an output of low pass filter 16 or eighth interim signal IS8 could be used as the final output of color detecting circuit 100. Alternatively, an output from low pass filter 16 or interim signal IS8 may be applied to an input of an integrator 18 to develop a signal which represents the total amount of yellow in the chrominance signal over a prescribed period of time.

Figure 4A:
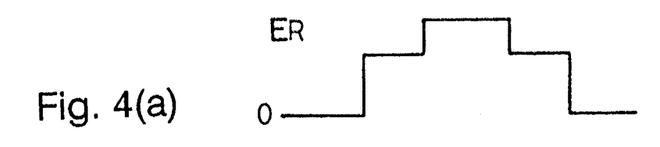
FIGS. 4A–4D are diagrams of typical waveforms of three color element signals and a composite signal according to the embodiment of FIG. 1
Figure 4B:
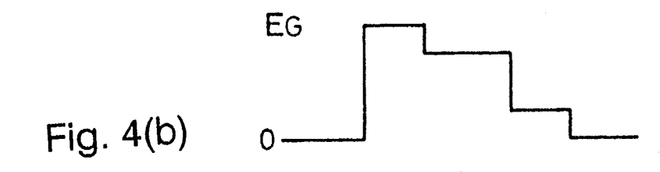
Figure 4C:
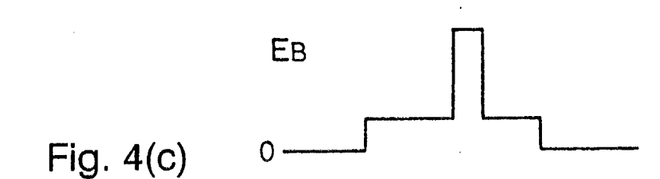
Figure 4D:
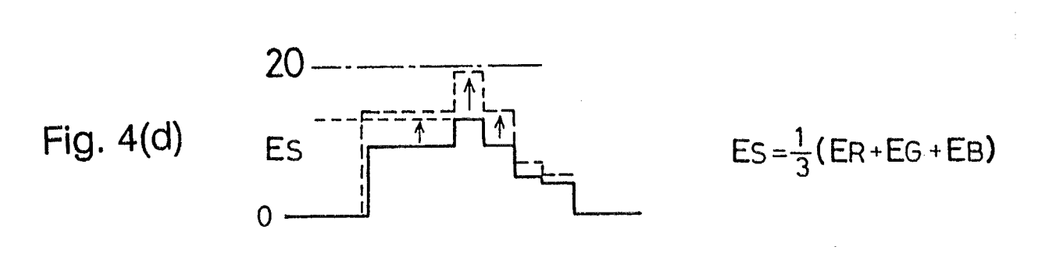

Referring to FIGS. 1, 4(a), 4(b), 4(c) and 4(d), as stated above, $E_R$, $E_G$ and $E_B$ represent the red, green and blue color element signals respectively. FIGS. 4(a), 4(b) and 4(c) show typical waveforms of color element signals $E_R$, $E_G$ and $E_B$, respectively. Peak detector circuit 8 generates a voltage proportional to the maximum amplitude of the signal output by adder circuit 7. Amplitude comparator circuit 9 compares the voltage output of peak detector circuit 8 to a reference signal 20, generating an error signal $E_S$. Error signal $E_S$ is fed back to gain control circuits 4, 5 and 6 to maintain parity between the peak amplitude of the signal generated by adder circuit 7 and reference signal 20. The solid line of FIG. 4(d) shows a wave form representing the sum of color element signals $E_{R0}$, $E_{G0}$ and $E_{B0}$ as generated by adder circuit 7 with color element signals $E_R$, $E_G$ and $E_B$ as shown in FIGS. 4(a), 4(b) and 4(c). The broken line of FIG. 4(d) shows the effect of automatic gain control on the sum signal when its peak amplitude is lower than reference signal 20.

It is noted that other colors can easily be detected using different embodiments of the present invention. Detection of magenta M or cyan C is possible by interchanging the ordering of red R, green G and blue B. For example, referring to FIG. 1, cyan can be detected by applying color signals $E_B$, $E_R$ and $E_G$ to the inputs of gain control circuits 4, 5, and 6, respectively.

Embodiment 2

Figure 5:
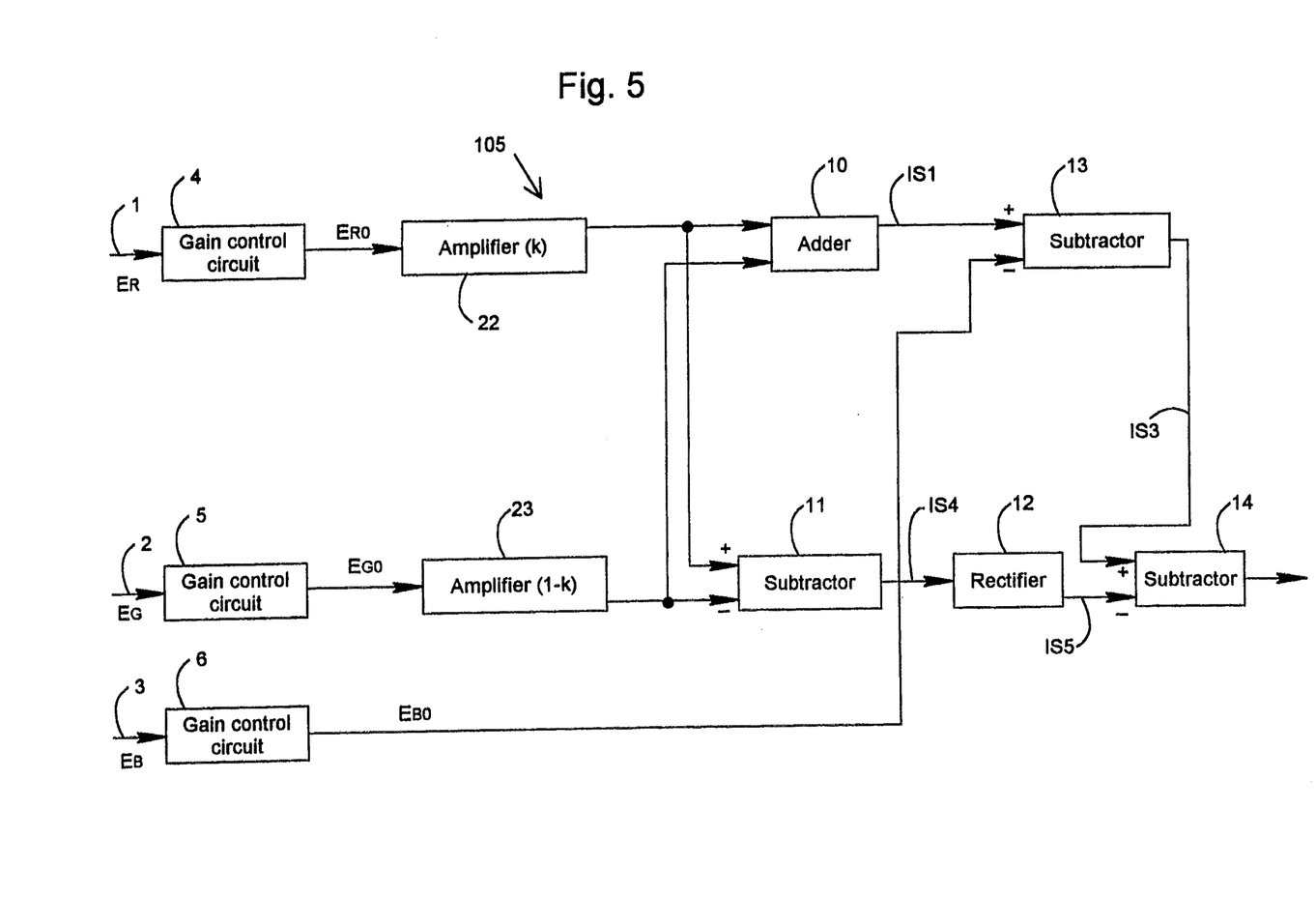
FIG. 5 is a block diagram of a circuit for detecting complementary colors in image signals according to another embodiment of the present invention.

Referring to FIG. 5 a color detecting circuit shown generally at 105 is similar to color detecting circuit 100 of FIG. 1. There are several differences between FIG. 1 and FIG. 5 and color detecting circuit 100 and color detecting circuit 105 shown therein. First, adder circuit 7, peak detection circuit 8 and amplitude comparator circuit 9, of FIG. 1, are not shown in FIG. 5, although they could be included. Adder circuit 7, peak detection circuit 8 and amplitude comparator circuit 9 would be connected to the corresponding components shown in FIG. 1. In addition, the alternative features of the color detecting circuit 100, including slicer 15, low pass filter 16, integrator 18 and bypass switch 17, are not shown, but could be included. Slicer 15, low pass filter 16, integrator 18 and bypass switch 17 would also be connected to the corresponding components as shown in FIG. 1. The major difference between color detecting circuit 105 and color detecting circuit 100 is that instead of having attenuators 26 and 27 as in color detecting circuit 100, amplifiers 22 and 23 are used in color detecting circuit 105. Outputs $E_{R0}$ and $E_{G0}$ are applied to amplifiers 22 and 23 respectively. The remaining elements of color detecting circuit 105 are identical to the corresponding elements of color detecting circuit 100 of FIG. 1.

Outputs of amplifiers 22 and 23 are added by adder 10 to generate a first interim signal IS1. Subtractor 13 subtracts output $E_{B0}$ of gain control circuit 6 from first interim signal IS1 to generate third interim signal IS3. Third interim output IS3 is applied to a positive input of subtractor 14. Output of amplifier 22 is applied to a positive input of a subtractor 11. Output of amplifier 23 is applied to a negative input of subtractor 11. Subtractor 11 subtracts output of amplifier 23 from output of amplifier 22 to generate a fourth interim signal IS4. Fourth interim signal IS4 is applied to a rectifier 12 to generate a fifth interim signal IS5. Thus fifth interim signal IS5 is the absolute value of fourth interim signal IS4. Fifth interim signal IS5 is applied to a negative input of subtractor 14 which subtracts fifth interim signal IS5 from third interim signal IS3 to generate seventh interim signal IS7.

Figure 6:
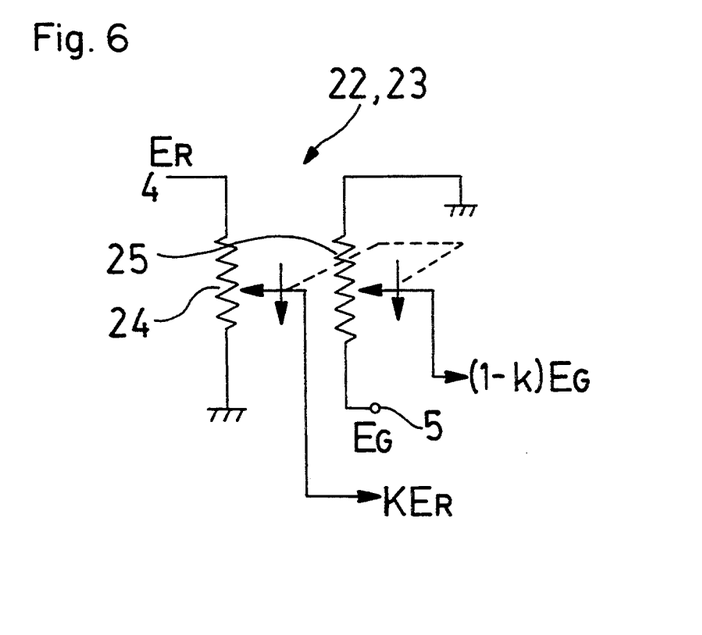
FIG. 6 is a diagram of a pair of ganged gain control circuits according to feature of the present invention.

Amplifier 22 has a gain of k while amplifier 23 has a gain of $(1-k)$. Thus, the sum of the gains of amplifiers 22 and 23 is unity. Referring also to FIG. 6, a device for controlling the gains (actually, attenuation, since the gains are less than 1) of amplifiers 22 and 23, consists of a ganged pair of variable resistors 24 and 25.

The effect of amplifiers 22 and 23 on the output generated by color detecting circuit 105 results in a new resultant signal given by Equation (4):

$$E_{Yellow} = k \cdot E_{R0} + (1-k) \cdot E_{G0} - E_B - |k \cdot E_{R0} - (1-k) \cdot E_{G0}| \quad (4)$$

where $k \leq 1$

Referring to FIG. 3(b), it is recognized that color detecting circuit 100 actually responds to a range of colors of which pure yellow is the centermost hue (in that case $k=0.5$). Actually color detecting circuit 100 responds not only to a pure yellow but also to yellows which lean somewhat toward red or which lean somewhat toward green. The central hue of this range of colors is an equal mixture of green and red which produces the pure yellow. Color detecting circuit 105 permits the center hue to be adjusted within a range between the adjacent primary colors, in the current example, red and green.

Note that while in the embodiment of FIG. 5, amplifiers 22 and 23 amplify outputs $E_{R0}$ and $E_{G0}$ of gain control circuits $E_R$ and $E_G$, respectively, it is recognized that color signals $E_R$ and $E_G$ could be directly applied to amplifiers 22 and 23 with gain control circuits 4 and 5 connected to outputs of amplifiers 22 and 23. It is also recognized that in such case, functional relationships between the gains of amplifiers 22 and 23 other than k and $(1-k)$ respectively will produce similar results with the approximately the same benefits. For example, the gain of amplifier 22 could remain constant while the gain of amplifier 23 is adjustable.

Figure 7:
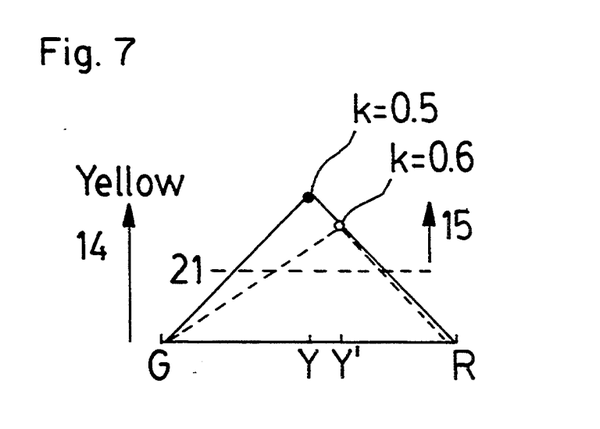
FIG. 7 is a diagram showing yellow output signal changes due to gain variations.

Referring, now to FIG. 7, when k is set to 0.5, the central color detected is yellow, which is the same as that detected by color detecting circuit 100. The region where yellow is the center color is shown by the solid line. When k is set to a value greater than 0.5, the central color of yellow becomes somewhat red as shown by the broken line. Thus, when k is set to 0.6, some colors that contain too much red to trigger color detecting circuit 100 will still trigger color detecting circuit 105. On the other hand, colors containing a sufficiently small amount of green to trigger color detecting circuit 100 will not trigger color detecting circuit 105. Again, the above statements apply to k=0.6. If k is set to a value of 0.4, then color detecting circuit 105 will be biased in favor of greener yellows and against redder yellows.

The output from subtractor 14 may be applied to slicer 15 as in FIG. 1 to filter out the portion of the signal at or above reference signal 21. Slicer 15 could be a digital circuit outputting 0 or 1 to indicate whether the color yellow was detected. The level of reference signal 21 and the range outputted by slicer 15 are also shown in FIG. 7.

Embodiment 3

Figure 8:
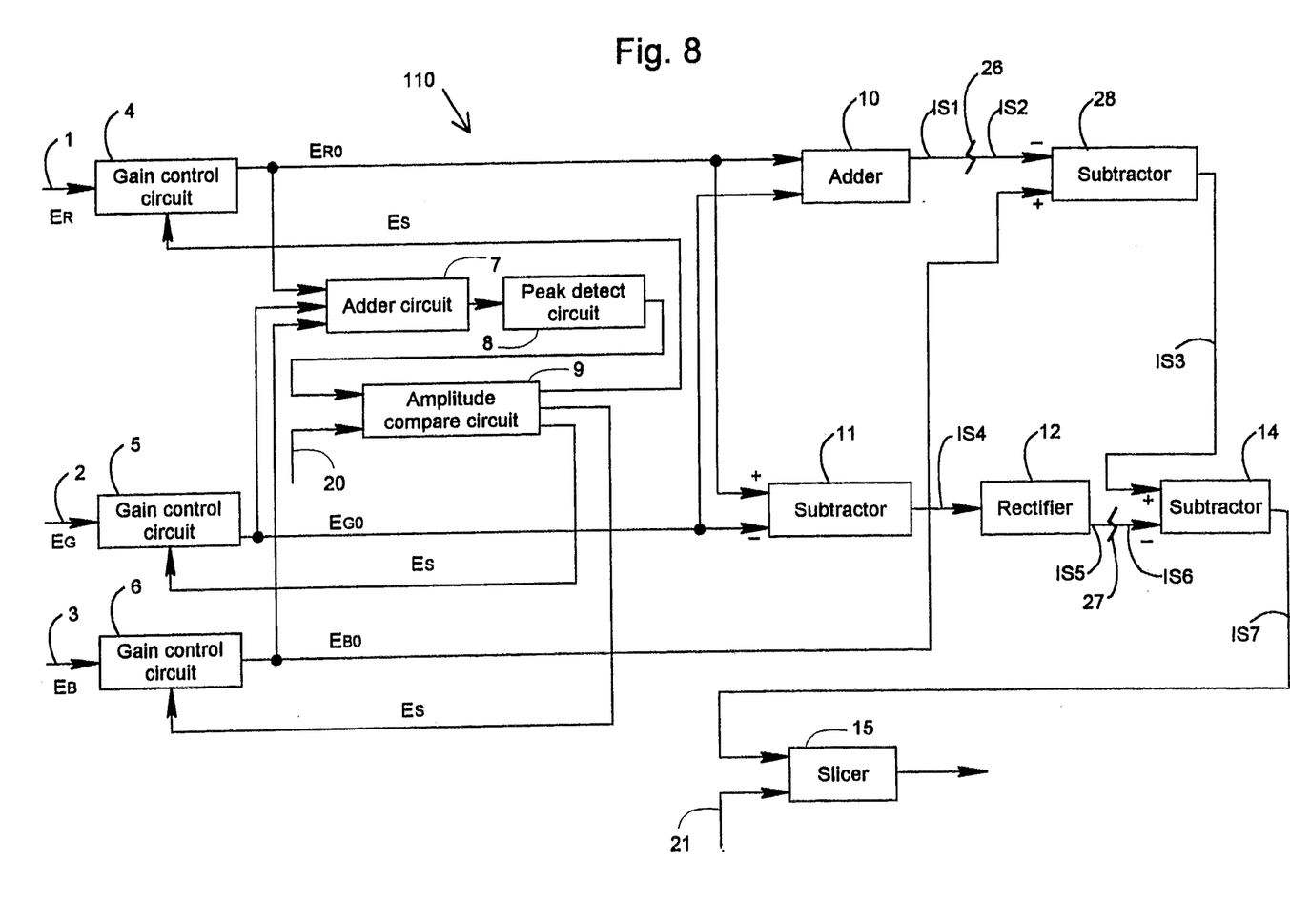
FIG. 8 is a block diagram of a circuit for detecting colors in image signals according to still another embodiment of the present invention.

Referring to FIG. 8, another embodiment of a color detecting circuit, shown generally at 110 is similar to color circuit 100 except that subtractor 13 is replaced by a subtractor 28. Inputs of subtractor 28 are arranged oppositely to those of subtractor 13 so that third interim signal IS3 is the result of subtracting second interim signal IS2 from output $E_{B0}$ of gain control circuit 6. Also, note that FIG. 8 does not show low pass filter 16, integrator 18 or bypass switch 17. All other correspondingly labeled elements are the same as described with reference to FIG. 1. The resultant output of color detecting circuit 110 is analogous to that for color detecting circuit 100, except that the center color detected is blue, instead of yellow. The output of color detecting circuit 110 is represented by Equation (5).

$$E_{Blue} = E_{B0} - (\tfrac{1}{2})\cdot(E_{R0} - E_{G0}) - (\tfrac{1}{2})\cdot|E_{R0} - E_{G0}| \quad (5)$$

Equation (5) is identical to Equation (2) except that the first and second terms are interchanged. The interchanging of these terms corresponds to swapping the inputs of subtractor 13 of FIG. 1 to create subtractor 28 of FIG. 8.

Figure 9:
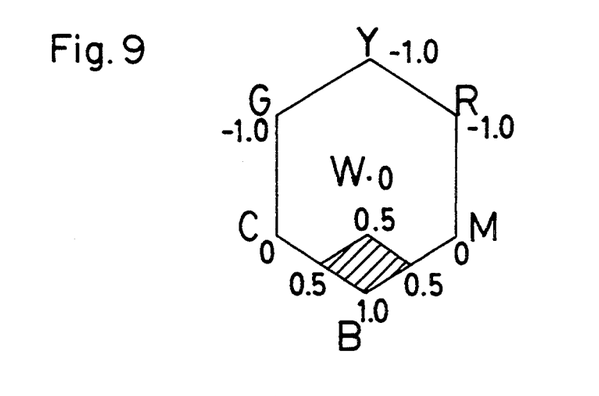
FIG. 9 is a vector diagram indicating the color blue according to the present invention.

FIG. 9 shows, on a color vector diagram, the range of color vector values that will trigger color detecting circuit 110. The shaded area represents the range where $E_{Blue}$ is greater than or equal to 0.5. Note that the adjacent colors of cyan C and magenta M clearly lie outside the zone and are therefore distinguished by the circuit. Also note that a range of unsaturated blues lie within the zone.

The modification of color detecting circuit 100 to produce color detecting circuit 110 can also be applied to color detecting circuit 105. In other words, complementary colors can be detected by color detecting circuit 105 by simply reversing the polarity of subtractor 13; i.e., substituting subtractor 28 for subtractor 13.

Figure 10:
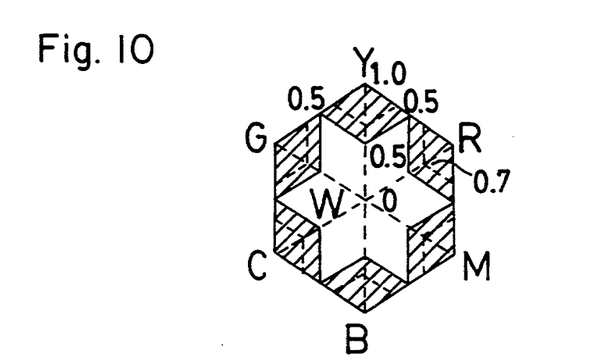
FIG. 10 is a vector diagram representing primary and complementary colors.

Referring to FIG. 10, any one of the primary colors red, green or blue or any of the complements of the primary colors, cyan, magenta or yellow, can be detected and adequately discriminated from other colors. In FIG. 10 the respective zone for each of the primary and complementary colors is shaded. In FIG. 10, Equations (2), (5) and analogous equations for the other colors are graphically represented. As can be seen, when the factor by which the absolute value term is multiplied is equal to ($\tfrac{1}{2}$), the zones representing adjacent colors, for example red and yellow, touch each other. Thus, certain mixtures, those lying on the boundaries, would register as one color or the other by the current invention. If a higher degree of discrimination is desirable, for example, if it desired to prevent any oranges from registering as yellow, the factor can be set to a higher value. In Equation (2'), identical to Equation (2) except that the factor of ($\tfrac{1}{2}$) is replaced by an attenuation factor A.

$$E_{Yellow} = (\tfrac{1}{2})\cdot(E_{R0} + E_{G0}) - E_{B0} - A\cdot|E_{R0} - E_{G0}| \quad (2')$$

Attenuation factor A represents the attenuation caused by attenuator 27 in color detection circuits 100 and 110. Higher discrimination between adjacent colors can be achieved by increasing the attenuation factor from 0.5. Correspondingly, a broader range of colors can be detected by decreasing the value of attenuation factor A. A circuit having an attenuation factor of 0.7 would detect the colors indicated by the dotted lines in FIG. 10.

With the present invention as described above, it is possible to detect a primary or complementary color in a wide-band signal from a color camera. The present invention provides a convenient and simple circuit to provide excellent discrimination of a specific color without sacrificing sensitivity. A warning device may be connected to the circuit described to alert a driver or personnel in a hazard zone. The circuit could also be connected to a kill-switch to automatically stop operation of equipment when the color is detected. For example, a color camera can be installed on a crane or any construction machinery. A wide angle lens could be used to monitor a large area.

Note that the above embodiments could be implemented by a purely digital system analogous to the analog systems described. If the input signals are converted by Analog to Digital converters and the digitized signal processed numerically in exactly the way described, the results will be essentially the same.

Also note that although the terms amplifier and attenuator are used separately at different points in the above disclosure, any of the attenuators could be replaced by an amplifier having an adjustable gain. Those elements identified as amplifier and having a gain less than unity or any of the attenuators could be a simple resistive voltage divider circuit.

The present invention is capable of detecting a color in smaller portion of the field of view of a camera. If the primary color signals are derived directly from a camera without the bandwidth limitations of the NTSC signal format, colors can be detected down to very small areas. However, even when the primary color signals are derived from an NTSC signal, the fact the improved in color discrimination achieved by the present invention permits a color to be discriminated down to lower saturation levels that are caused by temporal averaging of the chrominance signal. The effect is to increase the minimum size of an object whose color can be distinguished.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A circuit for detecting a color in a composite color image signal having first, second and third color elements, a desired color signal being generated in accordance with said color elements, comprising:
   means for adding said first and second color elements to generate a first sum signal;
   means for subtracting said first and second color elements to generate a first difference signal;

means for subtracting one of said third color element and said first sum signal from the other of said third color element and said first sum signal to generate a second different signal;

means for generating an absolute value of said first difference signal;

means for subtracting said absolute value from said second difference signal to generate a third difference signal; and generating means, responsive to said third difference signal exceeding a threshold value, for producing the desired color as an output signal of the detecting circuit.

2. Apparatus as in claim 1, wherein said output means includes a slicer circuit.

3. Apparatus as in claim 2, further comprising an integrator circuit for integrating said output signal.

4. Apparatus as in claim 2, further comprising:
a low pass filter; and
means for applying said output signal to said low pass filter to generate a low pass filtered signal.

5. Apparatus as in claim 4, further comprising an integrator circuit for integrating said low pass filtered signal.

6. Apparatus as in claim 1, further comprising means for attenuating said sum signal.

7. Apparatus as in claim 6, further comprising means for attenuating said absolute value.

8. Apparatus as in claim 7, wherein said output means includes a slicer circuit.

9. Apparatus as in claim 1, further comprising means for controlling respective amplitudes of said first, second and third color elements to maintain a constant sum of said respective amplitudes.

10. Apparatus as in claim 9, wherein said means for controlling includes:
a first gain control circuit, having a first gain, for amplifying said first color element to generate a first amplified color element;
a second gain control circuit, having a second gain, for amplifying said second color element to generate a second amplified color element;
a third gain control circuit, having a third gain, for amplifying said third color element to generate a third amplified color element;
means for summing said first, second and third amplified color elements to generate a composite signal; and
means for controlling said first, second and third gains responsively to said composite signal.

11. Apparatus as in claim 10, wherein said means for controlling includes:
a circuit for measuring a peak amplitude of said composite signal;
said circuit for measuring including means for generating a peak signal responsively to a result of said measuring;
means for supplying a first reference signal; and
a comparator for comparing said peak signal to said first reference signal.

12. Apparatus as in claim 11, further comprising:
means for attenuating said sum signal; and
means for attenuating said absolute value.

13. Apparatus as in claim 1, further comprising:
means for attenuating said sum signal; and
means for attenuating said absolute value.

14. Apparatus as in claim 13, further comprising:
said output means including a slicer circuit;
a low pass filter; and
means for applying said output signal to said low pass filter to generate a low pass filtered signal.

15. Apparatus as in claim 14, further comprising an integrator circuit for integrating said low pass filtered signal.

16. A method for detecting a color in a composite color image signal including first, second and third color elements, a desired color signal being generated in accordance with said color elements, comprising:
adding said first and second color elements to generate a first sum signal;
subtracting said first and second color elements to generate a first difference signal;
subtracting one of said third color elements and said first sum signal from the other of said third color element and said first sum signal to generate a second difference signal;
generating an absolute value of said first difference signal;
subtracting said absolute value from said second difference signal to generate a third difference signal;
detecting if said third difference signal exceeds a threshold value; and
producing the desired color in response to said third difference signal exceeding said threshold value.

17. A method as in claim 16, further comprising:
generating a second reference signal; and
comparing said third difference signal to said second reference signal to generate an output signal.

18. A method as in claim 17, further comprising time-integrating said output signal.

19. A method as in claim 17, further comprising:
low pass filtering said output signal to generate a low pass filtered signal.

20. A method as in claim 19, further comprising time-integrating said low pass filtered signal.

21. A method as in claim 16, further comprising attenuating said sum signal.

22. A method as in claim 21, further comprising attenuating said absolute value.

23. A method as in claim 22, further comprising:
generating a second reference signal; and
comparing said third difference signal to said second reference signal to generate an output signal.

24. A method as in claim 16, further comprising controlling respective amplitudes of said first, second and third color elements to maintain a constant sum of said respective amplitudes.

25. A method as in claim 24, wherein said step of controlling includes:
amplifying said first element by a first gain to generate a first amplified color element;
amplifying said second element by a second gain to generate a second amplified color element;
amplifying said third element by a third gain to generate a third amplified color element;
summing said first, second and third amplified color elements to generate a composite signal; and
controlling said first, second and third gains responsively to said composite signal.

26. A method as in claim 25, wherein said step of controlling includes:
measuring a peak amplitude of said composite signal;
generating a peak signal responsively to a result of said measuring;
supplying a first reference signal; and comparing said peak signal to said first reference signal.

27. A method as in claim 26, further comprising:
attenuating said sum signal; and
attenuating said absolute value.

28. A method as in claim 16, further comprising:
attenuating said sum signal; and
attenuating said absolute value.

29. A method as in claim 28, further comprising:
generating a second reference signal;
comparing said third difference signal to said second reference signal to generate an output signal; and
low pass filtering said output signal to generate a low pass filtered signal.

30. A method as in claim 29, further comprising time-integrating said output signal.

31. A circuit for detecting a color in an image signal having first, second and third color elements, comprising:
means for amplifying said first color element by a first gain to generate a first amplified color element;
said first second and third color elements having first, second and third amplitudes respectively;
said first amplified color element having a fourth amplitude;
means for amplifying said second color element by a second gain to generate a second amplified color element;
said second amplified color element having a fifth amplitude;
means for adjusting at least one of said first and second gains;
means for controlling one of said first, second and third amplitudes and said third, fourth and fifth amplitudes to maintain a constant sum of said third, fourth and fifth amplitudes;
means for adding said first amplified color element and said second amplified color element to generate a first sum signal;
means for subtracting said one of said first amplified color element and said second amplified color element from the other of said first amplified color element and said second amplified color element to generate a first difference signal;
means for subtracting said first sum signal from said third color element to generate a second difference signal;
means for generating an absolute value of said first difference signal; and
means for subtracting said second difference signal from said absolute value to generate a third difference signal.

32. Apparatus as in claim 31, wherein said means for adjusting includes means for maintaining a constant sum of said first gain and said second gain.

33. Apparatus as in claim 32, wherein said output means includes a slicer circuit.

34. Apparatus as in claim 33, further comprising an integrator circuit for integrating said output signal.

35. Apparatus as in claim 33, further comprising:
a low pass filter; and
means for applying said output signal to said low pass filter to generate a low pass filtered signal.

36. Apparatus as in claim 35, further comprising an integrator circuit for integrating said low pass filtered signal.

* * * * *